(12) United States Patent
Zheng et al.

(10) Patent No.: US 10,084,803 B2
(45) Date of Patent: Sep. 25, 2018

(54) RATING OF SIGNATURE PATTERNS FOR PATTERN MATCHING

(71) Applicant: Fortinet, Inc., Sunnyvale, CA (US)

(72) Inventors: Juneng Zheng, Fremont, CA (US); Hongbin Lu, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 339 days.

(21) Appl. No.: 14/981,459

(22) Filed: Dec. 28, 2015

(65) Prior Publication Data
US 2017/0187735 A1   Jun. 29, 2017

(51) Int. Cl.
*H04L 29/06* (2006.01)
(52) U.S. Cl.
CPC ...... *H04L 63/1425* (2013.01); *H04L 63/1416* (2013.01)
(58) Field of Classification Search
CPC .................................................. H04L 63/1425
See application file for complete search history.

(56) References Cited

U.S. PATENT DOCUMENTS

| 7,596,553 | B2 * | 9/2009 | Meirovitz | G06F 17/30985 |
| 8,843,627 | B1 * | 9/2014 | Baldi | H04L 43/026 |
| | | | | 709/224 |
| 2006/0212572 | A1 * | 9/2006 | Afek | H04L 63/145 |
| | | | | 709/225 |

\* cited by examiner

*Primary Examiner* — Kambiz Zand
*Assistant Examiner* — Thanh Le
(74) *Attorney, Agent, or Firm* — Hamilton, DeSanctis & Cha LLP (57) ABSTRACT

Systems and methods for rating of signature patterns are provided. According to one embodiment, a frequency of occurrence is determined by a network security system of each of multiple patterns within a pattern database containing a set of candidate patterns from which a set of patterns or sub-patterns thereof will be selected for inclusion within a pre-match list. For each pattern, the network security device determines whether a length of the pattern exceeds a pre-defined length; and, if so, cuts the pattern to generate multiple sub-patterns having the pre-defined length. A rating for each pattern or, as the case may be, each sub-pattern is then determined by the network device based on any or a combination of the frequency of occurrence of the pattern within the pattern database, the length of the pattern or the sub-pattern and a measure of redundancy within the pattern or sub-pattern.

20 Claims, 8 Drawing Sheets

RATING OF SIGNATURE PATTERNS FOR PATTERN MATCHING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present invention generally relate to adaptive or trainable data-pattern matching performed in the context of network security devices. In particular, embodiments of the present invention relate to rating of signature patterns that are used for pattern matching by selecting one or more rated signature patterns for populating a pre-match list that can be used to reduce the number of patterns required to be processed by a full-match module of an Intrusion Prevention System (IPS), for example.

Description of the Related Art

Packet-data communication, such as that conducted over the Internet, is extremely popular, and is becoming more so every day. People, companies, educational institutions, etc. routinely use Internet-connected computers and networks to conduct their affairs. Myriad types of data are transmitted over the Internet, such as correspondence, medical information, financial information, business plans, etc. Unfortunately, not all uses of the Internet are benign; on the contrary, a significant percentage of the data that is transmitted over the Internet every day is malicious. Examples of this type of data are viruses, spyware, malware, worms, etc.

Not unexpectedly, an industry has developed to combat these attempts to disrupt and harm not only these Internet-based communications, but also the networks and computers used to conduct them. This industry, and the effort to fight these threats generally, is often and herein referred to as "intrusion prevention," as very commonly such efforts are focused at points of access to private (e.g., corporate) networks. One important aspect of intrusion prevention involves identifying known threats (e.g., files that are or contain viruses, worms, spyware, malware, etc.) by particular data patterns contained therein. These patterns are often and herein referred to as "signatures" of these security threats, and are also often and at times herein referred to as "triggers" and by other names.

As such, data (e.g., Internet Protocol (IP)) packets flowing through, towards, or from a network segment, such as a particular router, switch, or network generally, are often screened—perhaps by an intermediate device, functional component, or other entity—for the presence of these signature data patterns. When particular packets, or sequences of packets, are identified as containing at least one of these signatures, those packets (or, again, sequences of packets) may be "quarantined," such that those packets cannot cause harm to any more networks and/or computers. These packets, removed from the normal flow of data traffic, can then be further examined without holding up that traffic generally.

In particular, systems that carry out intrusion prevention (i.e., intrusion-prevention systems (IPSs)), use pattern-matching techniques to attempt to detect malicious data, and to prevent that data from entering a given network segment. Typically, IPSs check both packet headers and packet payloads in order to detect content-based security threats. Standard detection methods consist of using pattern-matching or string-matching algorithms to search for malicious packets containing predefined signatures that characterize a threat. Typically, IPSs are deployed in-line with the network segment to be protected, such that all data that flows into and out of the protected network segment must pass through the IPS.

Pattern matching therefore plays a key role in signature-based IPSs. There are usually thousands of signatures in modern IPSs, and such pattern databases are growing fast as additional security holes and attacks are discovered on a daily basis. Most signatures contain a few characteristic patterns at fixed or floating locations but their importance with respect to other patterns/signatures is not evaluated or computed by existing network security systems. As such, when a defined and much smaller number of patterns are to be selected/shortlisted for a pre-matching implementation, for example, it becomes difficult to identify which subset of patterns should be selected/shortlisted for use in connection with performing pre-matching in the context of a high performance IPS, for example, in which memory limitations restrict the number of patterns that can be used for this purpose.

Therefore, there exists a need for systems and methods for rating of signature patterns that are used for pattern matching, and selecting one or more rated signature patterns for populating a pre-match list.

SUMMARY

Systems and methods are described for rating of signature patterns that can be used for pattern matching by selecting one or more rated signature patterns to be used in a preferred order by a full match module, or for populating a pre-match list that can be used by a pre-match module to reduce the number of patterns required to be processed by the full-match module of an Intrusion Prevention System (IPS). According to one embodiment, a frequency of occurrence is determined by a network security system of each of multiple patterns within a pattern database containing a set of candidate patterns from which a set of patterns or sub-patterns thereof will be selected for inclusion within a pre-match list to facilitate pre-match processing performed by the network security device. For each pattern, the network security device determines whether a length of the pattern exceeds a pre-defined length; and, if so, cuts the pattern to generate multiple sub-patterns having the pre-defined length. A rating for each pattern or, as the case may be, each sub-pattern is then determined by the network device based on any or a combination of the frequency of occurrence of the pattern within the pattern database, the length of the pattern or the sub-pattern and a measure of redundancy within the pattern or sub-pattern.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any

DETAILED DESCRIPTION

Systems and methods are described for rating of signature patterns that can be used for pattern matching by selecting one or more rated signature patterns to be used in a preferred order by a full match module, or for populating a pre-match list that can be used by a pre-match module to reduce the number of patterns required to be processed by the full-match module of an Intrusion Prevention System (IPS). Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Embodiments of the present disclosure provide systems and methods for rating of signature patterns that can be used for pattern matching by selecting one or more rated signature patterns to be used in a preferred order by a full match module, or for populating a pre-match list that can be used by a pre-match module to reduce the number of patterns required to be processed by the full-match module of an Intrusion Prevention System (IPS). A network security system and method thereof has been described for rating signature patterns based on one or a combination of frequency of occurrence of patterns in a pattern database maintained by the IPS, frequency of pattern match for sample traffic, length of pattern, redundancy in pattern, among similar other parameters.

An embodiment of the present disclosure provides a network security system that includes a pattern database containing candidate patterns from which a set of patterns or sub-patterns thereof can be selected for inclusion within a pre-match list to facilitate pre-match processing performed by the network security system. The network security system can further include a pattern occurrence frequency determination module that can be configured to determine the frequency of occurrence of each of multiple patterns within the pattern database. The network security system can further include a sub-pattern generation module that can be configured to determine, for each pattern, whether a length of the pattern exceeds a pre-defined length, and in such a case, cutting the pattern to generate multiple sub-patterns associated with the pattern, wherein each sub-pattern may be less than or equal to the pre-defined length. The network security system can further include a pattern/sub-pattern rating module that can be configured to determine a rating for each pattern or, as the case may be, each sub-pattern of the associated generated sub-patterns, based on any or a combination of the frequency of occurrence of the pattern within the pattern database, the length of the pattern or the sub-pattern, and a measure of redundancy within the pattern or sub-pattern. The network security system described herewith can provide efficient pattern matching for intrusion prevention using the rated signature patterns and sub-patterns by a pre-match module and full-match module.

In an exemplary implementation, the rating for each pattern or each sub-pattern of the associated generated sub-pattern can be based on any or a combination of the frequency of occurrence of the pattern within the pattern database, the length of the pattern or the sub-pattern, a measure of redundancy within the pattern or sub-pattern, frequency of occurrence of each pattern or the sub-patterns within sample traffic or real-time traffic observed by the network security system, among other adjustment parameters.

The present disclosure also provides a method to be used by a network security system for efficient pattern matching. The method can include the steps of determining, by a network security device, a frequency of occurrence of each of multiple patterns stored within a pattern database; determining, by the network device, for each pattern, whether length of the pattern exceeds a pre-defined length, and in such a case, cutting the pattern to generate multiple sub-patterns associated with the pattern, wherein each sub-pattern has the pre-defined length; and determining a rating for each pattern and each sub-pattern based on any or a combination of the frequency of occurrence of the pattern within the pattern database, the length of the pattern or the sub-pattern, frequency of occurrence of each pattern or the sub-patterns within sample traffic or real-time traffic observed by the network security system, and a measure of redundancy within the pattern or sub-pattern.

In an exemplary implementation, the rating can be adjusted based on one or a combination of the frequency of occurrence within the sample traffic or the real-time traffic, or can be adjusted manually, or including a blacklist containing multiple common patterns within typical network traffic and corresponding adjustable penalties to discourage selection of any of the common patterns for inclusion within the pre-match list.

In an aspect, the rating results in a lower rating for those of the patterns or the sub-patterns having a relatively higher frequency of occurrence within the pattern database than those having a lower frequency of occurrence within the pattern database. Similarly, the rating results in a higher rating for those of the patterns or, as the case may be, those of the associated generated sub-patterns having a relatively longer length. In an aspect, a rating of at least one of the patterns or, as the case may be, the associated generated sub-patterns can be adapted in real-time, at periodic intervals or at user defined intervals.

In an exemplary implementation, a set of patterns and sub-patterns can be stored for pre-matching of patterns based on the rating, and one or more patterns and/or sub-patterns can be stored in a particular order in the database for full-matching based on the rating. In an exemplary implementation, the set of patterns or sub-patterns, based on the rating of patterns and sub-patterns, can be selected for inclusion within a pre-match list to facilitate pre-match processing to be performed by the network security device.

In an exemplary embodiment, the measure of redundancy for each pattern patterns or, as the case may be, each sub-pattern of the associated generated sub-patterns can be based on the length of the pattern or the sub-pattern and character repetitions within the pattern or the sub-pattern.

The patterns or the sub-patterns can include any one or combination of fixed string patterns, regular expression patterns and floating type patterns.

Figure 1A:
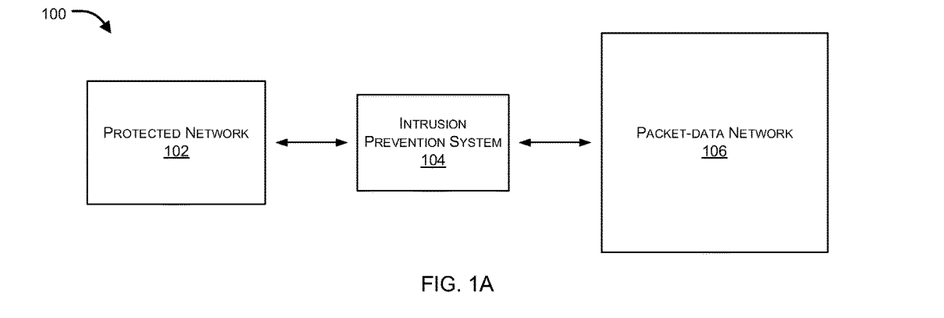
FIGS. 1A to 1D illustrate exemplary network architectures in which aspects of embodiments of the present invention can be implemented.
Figure 1B:
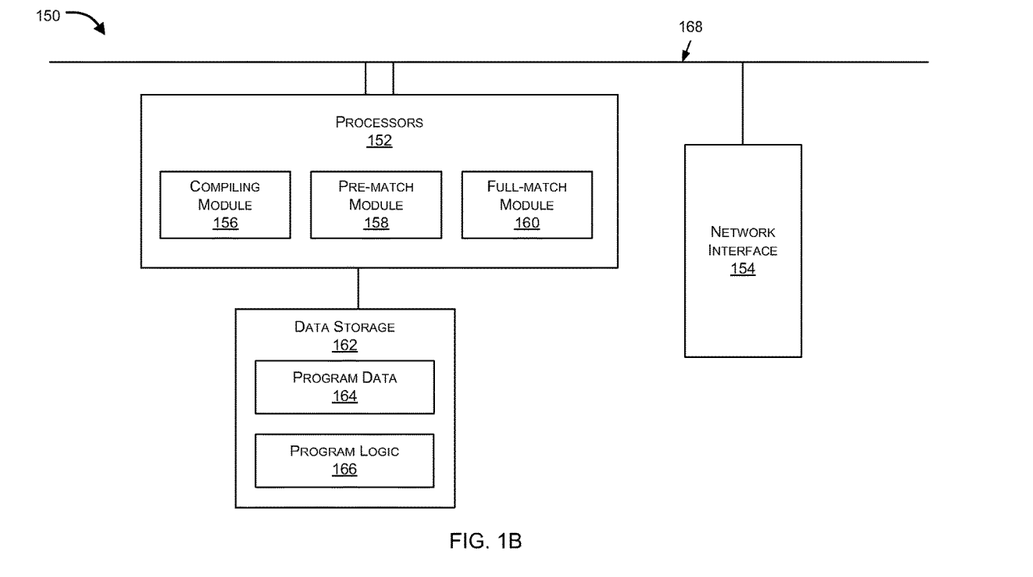

FIGS. 1A and 1B illustrate exemplary network architectures 100 and 150, respectively, in which aspects of the present invention can be implemented. FIG. 1A illustrates an Intrusion Prevention System (IPS) 104 placed between a protected network 102 and packet data network 106 to monitor data packets to and/or from the protected network 102 and prevent intrusion. The IPS 104 typically includes a pattern database (not shown) storing multiple patterns that can be used for pattern matching to detect and prevent potential network intrusion. The pattern database can be placed in a typical data center for protection of high volume network, and can be used to store patterns that can be used by a pre-match module (not shown) and/or full match module (not shown) to identify whether incoming traffic/packet(s) have one or more matching signature patterns.

FIG. 1B illustrates an exemplary processor 152 of an IPS that can include a compiling module 156 configured to allow compilation of signature patterns, which may be referred to interchangeably as patterns; a pre-match module 158 configured to pre-match a packet with selected signature patterns configured for pre-matching, which may be referred to hereafter as a pre-match list, to enable faster detection of potential intrusion; and a full match module 160 configured to perform full match of packet(s) with signature patterns stored in the database, which may be referred to hereafter as a full-match list. Any packet ingressing or egressing network interface 154 over data path 168 can be processed by the IPS. In an exemplary implementation, data storage 162 can include the pre-match list used by pre-match module 158, along with storing the full-match list used by full-match module 160. In an exemplary implementation, data storage 162 can include program data 164 and program logic 166, described in the form of different modules in the subsequent sections for, among other things, performing pre-matching, full-matching and rating/ranking of patterns. In an exemplary implementation, the systems and methods described herein can be used for determination of rating and/or ranking of multiple signature patterns stored in the pattern database including a pre-match list and a full-match list, and updating the pre-match and full match list based on the rating/ranking.

Figure 1C:
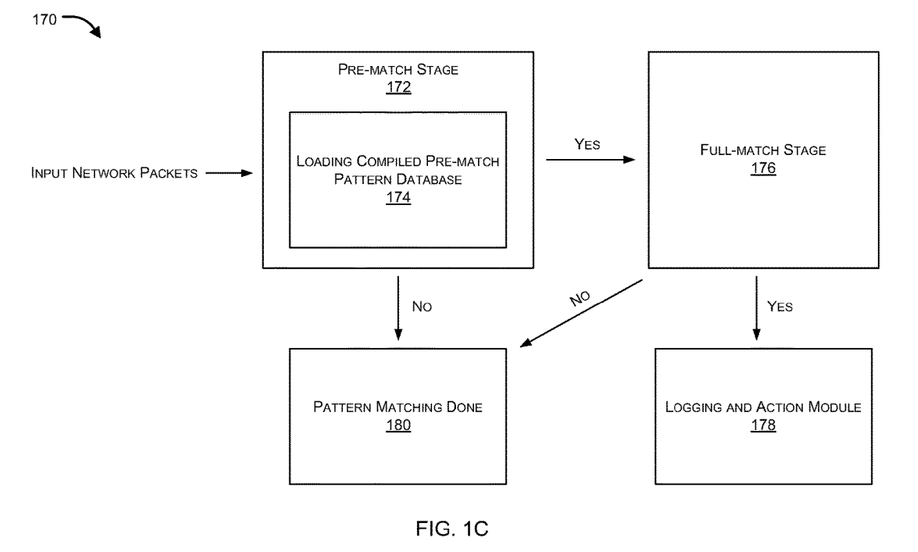

FIG. 1C illustrates exemplary processing 170 of an input network packet at different stages in accordance with an embodiment of the present invention. As shown in FIG. 1C, a network packet received by a network device having IPS implemented therein can process the packet at different stages for faster identification and prevention of potential intrusions. IPS systems that are used in data centers to monitor high volume traffic generally include pre-match stage, for example pre-match stage 172, and full-match stage, for example full-match module 176. During pattern matching, properties of received packets can be matched with patterns stored in a pre-match pattern database 174, and the packets can then be, if required (e.g., when the packet at issue matches a pre-match pattern), processed further at full-match stage 176.

In an exemplary implementation, packets can be initially processed by a pre-match module during a pre-match stage 172 with a lesser number of patterns stored in compiled pre-match pattern database 174. In an exemplary implementation, if, for a particular packet, a pre-match is not found (i.e., the packet does not match any pattern in the pre-match list), pattern matching can be marked as completed at 180. If a pre-match is found, the packet can be sent for full match at full-match stage 176, wherein if the full match is found for the packet, logging and action module 178 can enable logging of the detected intrusion and an appropriate configured preventive action can be taken. As those of ordinary skill in the art will appreciate, the determination of which signature patterns should be stored in a limited size pre-match pattern database 174 and the order in which signature patterns are to be matched during pre-match stage 172 and during full-match stage 176 are factors that contribute to the efficient processing of packets/traffic in connection with identifying and/or preventing potential intrusions.

Figure 1D:
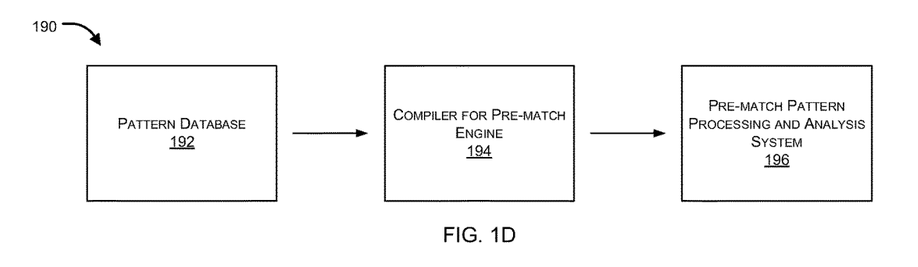

FIG. 1D illustrates processing of patterns stored in a pattern database 192 in accordance with an embodiment of the present invention. As shown in FIG. 1D, pattern database 192 can include multiple patterns that can be used by the IPS. The patterns stored in pattern database 192 can include a set of patterns to be used for pre-matching, which may be referred to interchangeably as pre-match patterns, and patterns to be used for full-matching, which may be referred to interchangeably as full-match patterns. The IPS can include a compiler for pre-match engine 194 for compiling the set of pre-match patterns from the pattern database 192 by processing patterns stored in pattern database 192. In an exemplary implementation, the compiler for pre-match engine 194 can compile a set of patterns to be used for pre-matching.

In an exemplary embodiment, the compiler for pre-match engine 194 can determine a length of each of the patterns stored in pattern database 192, split the patterns into sub-pattern when the length of any pattern is greater than a defined threshold to ensure that each sub-pattern has the same length, determine a frequency of occurrence of each of the patterns and/or sub-patterns in pattern database 192, and rate each of the patterns and/or sub-pattern based on any or a combination of the frequency of occurrence of each of the patterns and sub-patterns, the lengths of the patterns and sub-patterns, and the redundancy present in each of the patterns and sub-patterns.

In an exemplary implementation, the compiler for pre-match engine 194 can determine, based on the rating, a set of patterns and/or sub-patterns that can be used for updating the pre-match list. Further, the IPS can include a pre-match pattern processing and analysis system 196 that allows processing of the pre-match list and the set of patterns for updating the pre-match list using other factors including manual configuration. In an exemplary implementation, the IPS can also allow deletion and/or inclusion of patterns from/to the pre-match list manually. As described in further detail below, in an exemplary implementation, the network security system (e.g., an IPS) implementing the pattern matching methodologies described herein can make use of a blacklist (not shown), including a set of blacklisted patterns, which are desired not to be part of the pre-match list and based on which the pre-match list can accordingly be adjusted.

Figure 2:
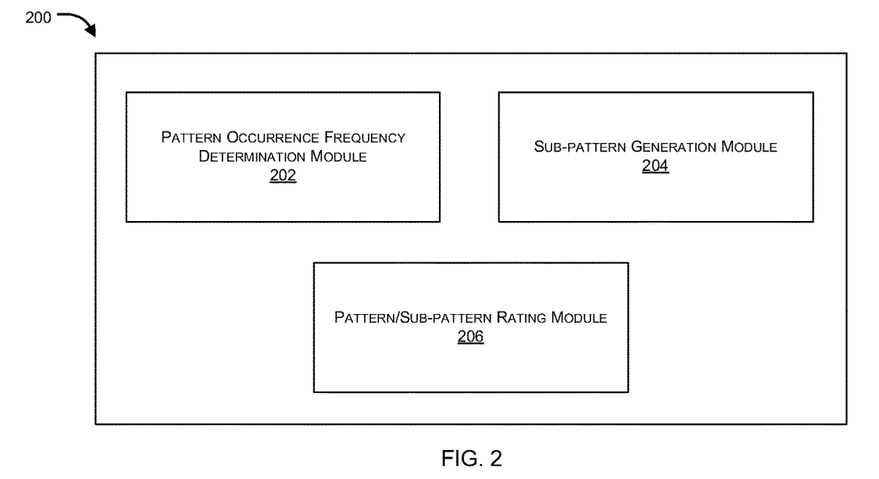
FIG. 2 illustrates exemplary functional modules for a signature pattern rating and optimization system in accordance with an embodiment of the present invention.

FIG. 2 illustrates exemplary functional modules for a signature pattern rating and optimization system 200 in accordance with an embodiment of the present invention. In the context of the present example, signature pattern rating and optimization system 200 processes a pattern database (not shown), containing multiple candidate signature patterns to be used by a pre-match module (not shown) and/or a full-match module (not shown) of a network security system (e.g., an IPS) (not shown). In one embodiment, signature pattern rating and optimization system 200 is implemented within a network security system (e.g., an IPS) to allow dynamically adaptive data-pattern matching based on observed real-time network traffic, for example. Alternatively, signature pattern rating and optimization system 200 may be a standalone system separate and apart from the network security system whose pattern database is being processed.

In an aspect, system 200 can rate candidate signature patterns stored in the pattern database, and based on the generated ratings, can select a set of patterns and/or sub-patterns to include within a pre-match list to be used by a pre-match module of an IPS, for example. In another aspect, system 200 can include a pattern occurrence frequency determination module 202 that can be configured to determine a frequency of occurrence of each candidate signature pattern of multiple candidate signature patterns within the pattern database; a sub-pattern generation module 204 that can be configured to determine, for each candidate pattern, whether length of the pattern exceeds a pre-defined length, and in such a case, cutting the pattern to generate multiple sub-patterns associated with the pattern, wherein each sub-pattern of the generated sub-patterns may be of the pre-defined length; and a pattern/sub-pattern rating module 206 that can be configured to determine a rating for each pattern or, as the case may be, of the associated generated sub-patterns based on any or a combination of the frequency of occurrence of the pattern within the pattern database, the length of the pattern or the sub-pattern, and a measure of the redundancy within the pattern or sub-pattern. In an aspect, the network security system can provide efficient pattern matching for intrusion prevention using the rated patterns and sub-patterns by a pre-match module (not shown) and full-match module (not shown).

In an exemplary implementation, the pattern/sub-pattern rating module 206 can determine the rating for each pattern or for each sub-pattern of the associated generated sub-patterns based on any or combination of the frequency of occurrence of the pattern within the pattern database, the length of the pattern or the sub-pattern, a measure of redundancy within the pattern or sub-pattern, and the frequency of occurrence of each pattern or the sub-patterns within sample traffic or real-time traffic observed by the network security system.

In an exemplary implementation, the pattern/sub-pattern rating module 206 can be configured to enable adjustment of the rating based on one or a combination of the frequency of occurrence within the sample traffic or the real-time traffic, or based on manual adjustment, or based on a blacklist that contains common patterns within typical network traffic and corresponding adjustable penalties to discourage selection of any of the common patterns for inclusion within the pre-match list.

In an aspect, the rating results in a lower rating for those of the patterns or sub-patterns having a relatively higher frequency of occurrence within the pattern database than those having a lower frequency of occurrence within the pattern database. Similarly, the rating results in a higher rating for those of the patterns or, as the case may be, those of the associated generated sub-patterns having a relatively longer length. In an exemplary implementation, the rating of at least one the patterns or, as the case may be, the associated generated sub-patterns can be adapted in real-time, at periodic intervals or at user defined intervals.

In an aspect, different parameters can be used for rating the patterns and sub-patterns and creating/updating the set of patterns to be included in the pre-match list. In an exemplary implementation, the rating can be based on the length of the patterns. For example, for determining the rating of fixed location type patterns, Equation #1 can be used, and for determining the rating of floating type patterns, Equation #2 can be used.

$$\text{Rating} = X^* \text{Len} \qquad \text{EQ \#1}$$

$$\text{Rating} = X^* \text{Len} - Y^* \text{Redundancy} \qquad \text{EQ \#2}$$

In one embodiment, 'Len' represents the length of the pattern (i.e., the number of characters in the pattern), 'Redundancy' represents a measure of entropy within the pattern (e.g., based on the number of repeated character values within the pattern and the length of the pattern) and constant integers X and Y can, for example, be 650 and 1000 respectively, based on empirical data regarding entropy of characters, average packet size and the logarithm model represented by Equations #3 and #4 (below). The constant numbers 650 and 1000, for example, can be calculated for an average packet size of about 1-2K. Should such characteristics be different within a particular network environment, the equations and/or constants used may be modified as appropriate.

In an exemplary implementation, as shown in Equation #2, the rating can be adjusted based redundancy of the pattern based on its length and repetitions. For example, the pattern "AAAA" has larger redundancy than pattern "ABCD", and hence, in one embodiment, the rating of pattern "AAAA" would be rated lower than that of pattern "ABCD". In an exemplary embodiment, the measure of redundancy for each pattern or, as the case may be, each sub-pattern of the associated generated sub-patterns can be based on the length of the pattern or the sub-pattern and character repetitions within the pattern or the sub-pattern.

In an exemplary implementation, the rating can be determined and adjusted based on frequency of occurrence of the patterns and sub-patterns. Frequency of occurrence of the patterns and/or sub-patterns can be used for rating the patterns and/or sub-patterns and for selecting/determining a set of patterns and sub-patterns to be included in the pre-match list. In an exemplary implementation, rating of the patterns and/or the sub-patterns can be done using the following equation:

$$\text{Rating}^* = 1.0 - \text{pow}(\text{Freq}, \tfrac{3}{4}) * \log(2.0)/\log(T) \quad \text{EQ \#3}$$

where 'T' is the total number of entries in the pre-match list or in the pattern database of its type, and 'Freq' is the frequency of occurrence of the patterns within the pattern database. While alternative models and factors may be used in alternative embodiments, the logarithmic model of Equation #3 and exponential factor ¾ have been derived based on logical analysis and experimental tests. The frequency of occurrence based rating adjustment not only provides better selections of the set of patterns and/or sub-pattern but also reduces the collisions of correlation table on hardware or software based algorithms and thus improves overall performance of the IPS.

In another exemplary implementation, the rating can be determined and adjusted based on the frequency of occurrence of each pattern within sample traffic or real-time traffic observed by the network security device. The module 206 can determine the frequency of occurrence of each of the patterns and/or sub-patterns within sample traffic or real-time traffic observed by the network security device, and rate and/or adjust the already rated patterns and sub-patterns accordingly. Equation #4 listed below can be used for rating or adjusting the rating of patterns and sub-patterns.

$$\text{Rating}^* = 1.0 - \text{pow}(\text{Freq}, \tfrac{1}{3}) * \log(2.0)/\log(T) \quad \text{EQ}^*4$$

where 'T' is the total number of packets provided in the sample traffic, and 'Freq' is the frequency of occurrence of matching patterns inside all packets of the sample traffic. In an exemplary implementation, the rating of the patterns and/or sub-pattern can be adjusted/updated based on different samples of the traffic, and accordingly the pre-match list can be updated at regular intervals.

In an exemplary implementation, rating of patterns and/or sub-patterns can be further adjusted/optimized based on a blacklist that can contain common patterns in the traffic, or by manually adjusting its occurrence in database. The blacklist can work as a mechanism for exclusion of patterns that should not be included in the pre-match list. For example, the rating of the pattern "HTTP" can be adjusted to be low as this pattern is common in network traffic and as such may not be not efficient as a pre-match pattern. In an aspect, the blacklist with adjustable penalties for fine-tuning the selections of pre-match patterns can be defined manually by a network administrator. In an exemplary implementation, the blacklist can also be generated by the system 200 based on the frequency of occurrence of pattern in the database, and the frequency of occurrence of a particular pattern in sample and/or real-time traffic. The rating of patterns and/or sub-patterns can be further adjusted based on manual input by the network administrator.

In an exemplary implementation, as explained above, if the length of any pattern of in the pattern database is larger than a predefined threshold, the pattern can be divided into sub-patterns, and the rating of each sub-pattern can accordingly be determined by system 200. In one embodiment, long patterns can be divided into sub-patterns to reduce the hardware cost and improve overall performance of system 200. For example, long floating type patterns can be divided/cut into sub-patterns of length 4, 8 or 12 characters, for instance. System 200 can calculate the ratings of sub-patterns of size 4, 8 and 12, and can determine the best rated set of patterns and/or sub-patterns that can be included in the pre-match list. In an aspect, for a fixed location type pattern that is longer than 2 or 4 characters, system 200 can divide the patterns into sub-patterns. System 200 can implement a best-cut algorithm for determining the patterns that need to be divided, and optimal position at which the patterns should be divided. In an exemplary implementation, system 200 can be configured to preserve most original pattern information during implementation of best-cut implementation. System 200 can preserve most original pattern information while keeping the memory usage at a minimum, and hence reduced hardware cost can be achieved. The best-cut approach also reduces collisions within the correlation table significantly.

In an exemplary implementation, system 200 can be configured to convert a regular expression pattern into multiple exact match type patterns, and accordingly determine a rating for the regular expression pattern. For example, system 200 may for a given regular expression (e.g., "/(XYZ|ABC)–(test|exam)/") form four exact match type patterns, "XYZ-test," "XYZ-exam," "ABC-test," and "ABC-exam," and then subsequently determine ratings for each of these exact match type patterns.

In an aspect, system 200 can be configured to extract patterns, and rate them on per compatible regular expressions (PCRE). Such extracted patterns can be treated the same as floating patterns, but as an alternation group, wherein the rating of an alternation group can be based on the minimum rating of the ratings of the patterns in the alternation group as follows:

$$\text{Rating} = \text{Min}(\text{Rating}(\text{Group})) - 50 * \text{Count} \quad \text{EQ \#5}$$

Where 'Count' represents the number of patterns in the alternation group. System 200 can also provide fine-tuning controls on selection of patterns to be included in pre-match list at the compiler level to save memory and to improve overall performance of the IPS. For example, the pre-match patterns can be selected/updated only for those low-rating signatures or for those medium-rating signatures with at least 10% improvement after observing the frequency of occurrence of patterns or sub-pattern in a sample traffic and real-time traffic.

System 200 can also implement a function to avoid selection of duplicate patterns (e.g., the same length or shorter pattern as an existing pattern with the same content), as well as can include some other functions for fine-tuning low-rating signatures with combinations of two overlapping length 4 patterns, for example, for a floating pattern with length 6 or 7 with some adjustments of the rating.

In an exemplary implementation, a set of patterns and/or sub-patterns can be stored for using during a pre-matching stage based on the updated rating, and the set of patterns and/or sub-patterns can be stored in a particular order in a database for a full-matching stage based on the rating. In an exemplary implementation, the set of patterns and/or sub-patterns, based on their respective ratings, can be selected for inclusion within a pre-match list to facilitate pre-match processing to be performed by the network security device.

The patterns and/or the sub-patterns can include any one or a combination of fixed string patterns, regular expression patterns, and floating type patterns.

Figure 3:
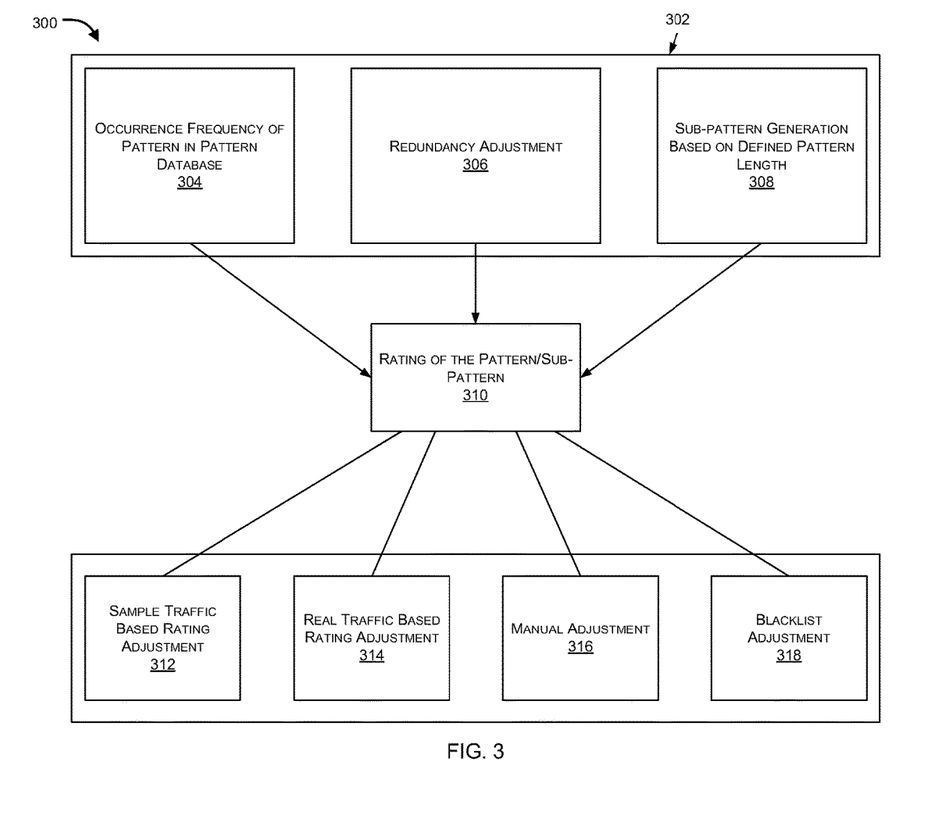
FIG. 3 is a block diagram presenting a logical view of a signature pattern rating and optimization system in accordance with an embodiment of the present invention.

FIG. 3 is a block diagram presenting a logical view of a signature pattern rating and optimization system 300 in accordance with an embodiment of the present invention. As shown in FIG. 3, signature pattern rating and optimization system 300 can perform similar functions as discussed above with reference to FIG. 2. Rating of pattern/sub-pattern 310 can be determined and optimized based on any or combination of occurrence frequency of each pattern in pattern database 304, a measure of redundancy within the pattern or sub-pattern as computed by redundancy adjustment block 306, and the length of the pattern or sub-pattern, wherein sub-patterns may be generated based on a pre-defined and/or configurable pattern length at block 308. Other parameters include, but are not limited to, sample traffic based rating adjustment 312, real-time traffic based rating adjustment 314, manual adjustment 316, and blacklist pattern based adjustment 318 can also be used for computation and/or adjustment of the ratings of patterns/sub-patterns.

As those skilled in the art will appreciate, rating of patterns and/or sub-patterns can be first determined based on the frequency of occurrence, and length of the patterns and/or sub-patterns, wherein the rating of the patterns and/or sub-patterns based on length can also include a negative factor for redundancy present in the patterns and/or sub-patterns. Once the basic rating has been generated for all the patterns and/or sub-patterns in the pattern database, the basic rating can be further optimized/adjusted based on other inputs, and a set of patterns and/or sub-patterns can finally be included in a pre-match list based on the updated rating.

Figure 4A:
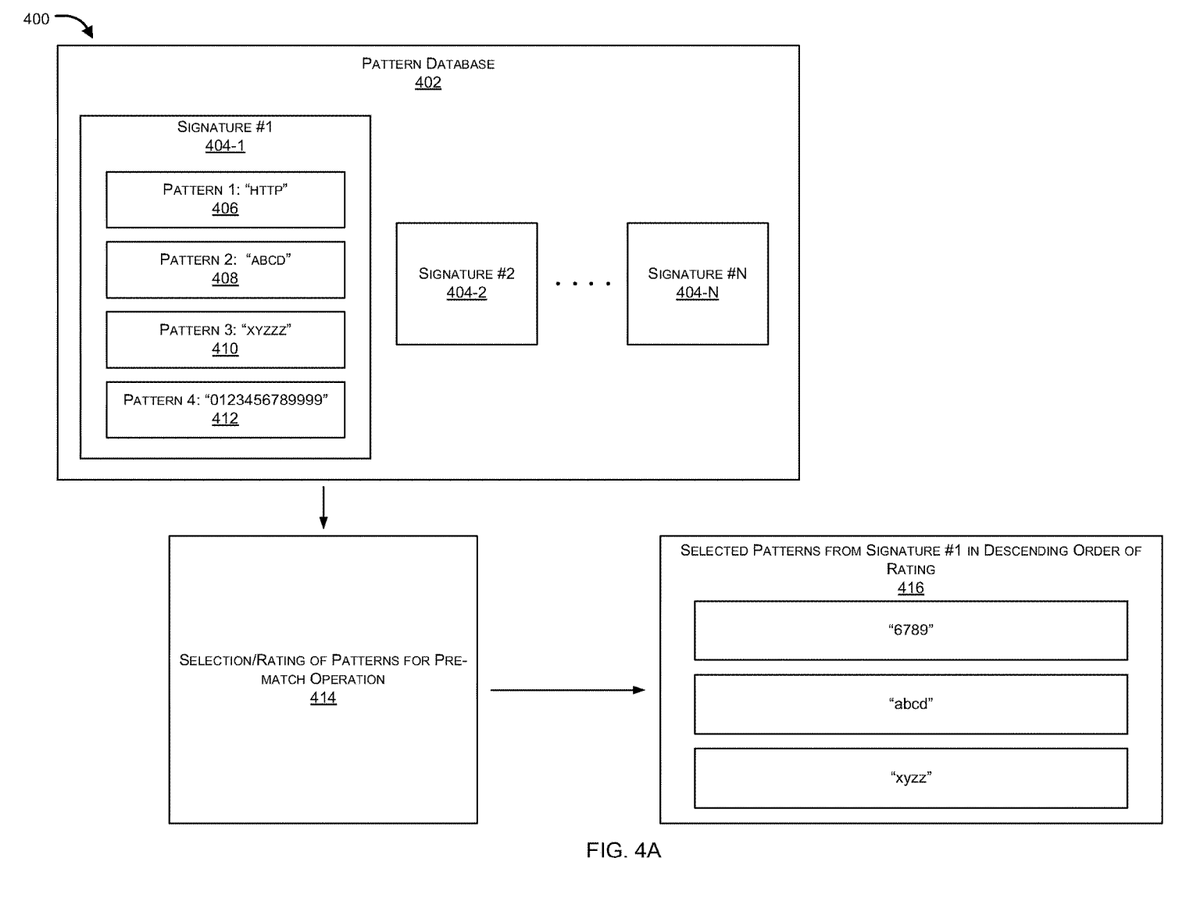
FIGS. 4A and 4B are block diagrams illustrating rating of signature patterns based on occurrence frequency and pattern length, along with population of pre-match list in accordance with an embodiment of the present invention.
Figure 4B:
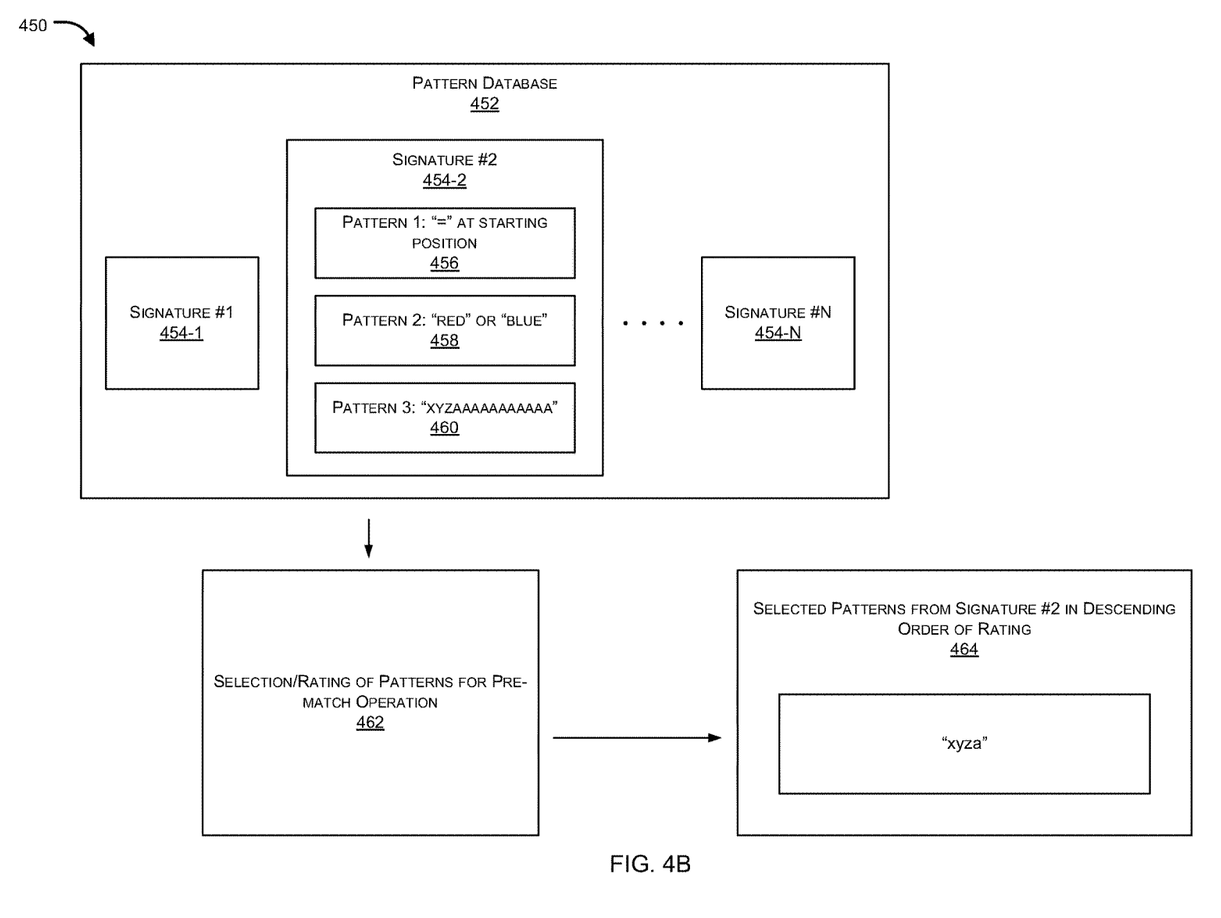

FIGS. 4A and 4B are block diagrams illustrating rating of signature patterns based on occurrence frequency and pattern length, along with population of a pre-match list in accordance with an embodiment of the present invention. As shown in FIG. 4A, a pattern database 402 can include/store multiple signatures #1 404-1, #2 404-2, . . . , #N 404-N, wherein each signature can include one or more patterns. For example, signature #1 404-1 includes four patterns with Pattern 1 being "HTTP" 406, Pattern 2 being "ABCD" 408, Pattern 3 being "XYZZZ" 410, and Pattern 4 being "0123456789999" 412. In accordance with an embodiment of the present invention, each pattern can be rated based on its occurrence frequency in pattern database 402, the redundancy within the pattern, and the pattern length, wherein a higher occurrence frequency in pattern database 402 results in a lower rating of the pattern at issue. Similarly, all other factors being equal, the greater the length of a pattern, the higher its rating will be. Finally, all other factors being equal, the higher the internal redundancy within a pattern, the lower its rating will be.

As also mentioned above, when the length of a pattern is longer than a pre-defined length (say, 4 characters), the pattern can be divided into sub-patterns of equal lengths. For instance, pattern #4 412 of signature #1 404-1 can be divided (assuming the desired length of each pattern is 4 characters) into sub-patterns such as "0123," "4567," "8999," and so on, or alternatively into sub-patterns such as "6789," "2345," or into any other sub-pattern, wherein the cut of each pattern can be efficiently done so as to produce low redundancy sub-patterns. Block 414 shows rating/selection of patterns from the list of patterns/sub-patterns of signature #1. In the context of the present example, in block 416, the top three rated patterns/sub-patterns have been selected. Notably, in this example, Pattern 1 "HTTP" 406 has not been selected as a result of its high occurrence frequency in pattern database 402, sample traffic and/or real-time traffic. Those skilled in the art will appreciate that the presentation of selected patterns/sub-patterns for pre-matching operation at block 416 are completely exemplary, and any other suitable patterns would be selected as appropriate based on their respective ratings. For instance, instead of the "xyzz," sub-pattern of Pattern 3 410, "2345" of Pattern 4 412 could have been higher rated, as the redundancy within "xyzz" is higher due to the two occurrences of the character 'z' within a relatively short 4 character pattern.

Similarly, in FIG. 4B, signature #2 454-2 can include three patterns to be rated, namely, pattern 1 456 with an '=' symbol at the starting position, pattern 2 as "red" or "blue" 458, and pattern 3 as "XYZAAAAAAAAAAA." During selection of patterns for the pre-match list, the top rated sub-pattern may be "XYZA," for instance, as it may be possible that patterns 456 and 458 had higher occurrence frequencies, and pattern 3 460, when split into sub-patterns resulted in "XYZA" having the least occurrence frequency and also the least redundancy within the sub-pattern.

Figure 5:
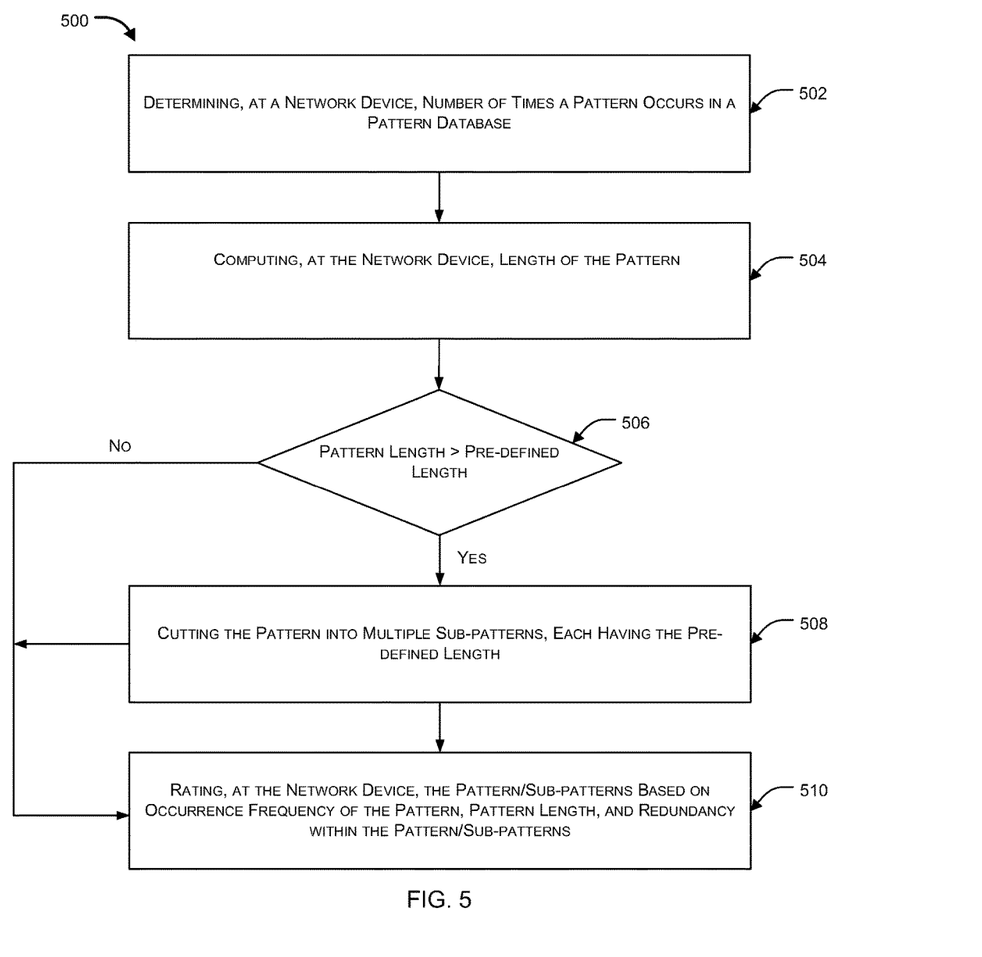
FIG. 5 is a flow diagram illustrating signature pattern rating and optimization processing in accordance with an embodiment of the present invention.

FIG. 5 is a flow diagram 500 illustrating signature pattern rating and optimization processing in accordance with an embodiment of the present invention. As shown in FIG. 5, the method for signature pattern rating and optimization can be used for generation of sub-patterns based on the length of a pattern, determination of ratings of patterns and/or sub-patterns based on any or a combination occurrence frequency of patterns and/or sub-patterns in a pattern database, the length of patterns and/or sub-patterns, the redundancy within patterns/sub-patterns, the type of patterns, the occurrence frequency of patterns and/or sub-patterns in sample/real-time traffic, among other adjustment factors.

In an exemplary implementation, the best rated patterns and/or sub-patterns can be selected for inclusion in the pre-match list. In an aspect, the method can include the steps of determining, at a network device, the number of times a pattern occurs in a pattern database, as shown at step 502; computing, at the network device, the length of the pattern, as shown at step 504; determining whether the pattern length is greater than a pre-defined length, as shown at step 506, cutting the pattern into multiple sub-patterns, each having the pre-defined length when the pattern length is greater than the pre-defined length as shown at step 508; and finally rating, at the network device, the patterns/sub-patterns based on the occurrence of frequency of patterns/sub-patterns, the pattern length, the redundancy within patterns and/or sub-patterns as shown at step 510. In an aspect, the rating can further be customized and/or updated based on other adjustment factors (e.g., using a blacklist of common patterns), or based on manual inputs supplied by a network administrator.

In an aspect, the method can determine, for each pattern stored in the pattern database, whether the length of the pattern exceeds a pre-defined length, and in such a case, cut/divide the pattern to generate a multiple sub-patterns associated with the pattern, wherein each sub-pattern of the generated sub-patterns can be of the pre-defined length. The method can be configured to determine the rating for each pattern and of each sub-pattern based on any or a combination of the frequency of occurrence of the pattern/sub-pattern within the pattern database, the length of the pattern/sub-pattern, the frequency of occurrence of each pattern/sub-pattern within sample traffic or real-time traffic observed by the network security system, and a measure of redundancy within the pattern/sub-pattern. In an embodiment, the method can used by a network security system for selection of patterns/sub-patterns to be included in the pre-match list for efficient matching of patterns by reducing the number of times the full match stage is invoked.

Figure 6:
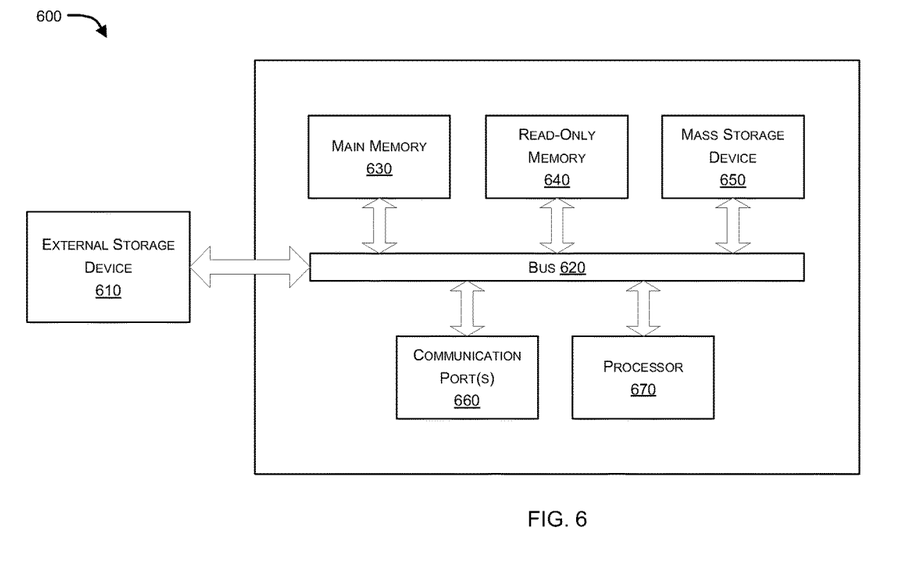
FIG. 6 illustrates an exemplary computer system in which or with which embodiments of the present invention may be utilized.

FIG. 6 is an example of a computer system 600 with which embodiments of the present disclosure may be utilized. Computer system 600 may represent or form a part of a network security system (e.g., an IPS or the like), a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A network security system comprising:
    a pattern database containing candidate patterns from which a set of patterns or sub-patterns thereof will be selected for inclusion within a pre-match list of threat detection signatures;
    a non-transitory storage device having embodied therein instructions in a form of a plurality of modules; and
    one or more processors coupled to the non-transitory storage device and operable to execute the plurality of modules, wherein the plurality of modules include:
        a pattern occurrence frequency determination module, which when executed by the one or more processors determines a frequency of occurrence of each pattern of the plurality of patterns within the pattern database;
        a sub-pattern generation module, which when executed by the one or more processors determines for each pattern of the plurality of patterns whether a length of the pattern exceeds a pre-defined length, and in such a case, cutting the pattern to generate a plurality of sub-patterns associated with the pattern, each sub-pattern of the plurality of generated sub-patterns having the pre-defined length;
        a pattern/sub-pattern rating module, which when executed by the one or more processors determines a rating for each pattern of the plurality of patterns or, as the case may be, each sub-pattern of the associated generated plurality of sub-patterns based on any or a combination of the frequency of occurrence of the pattern within the pattern database, the length of the pattern or the sub-pattern, and a measure of redundancy within the pattern or sub-pattern;
        a pre-match list population module, which when executed by the one or more processors updates the pre-match list by selecting for inclusion within the pre-match list a predetermined number of one or more of the patterns of the plurality of patterns and the sub-patterns of the associated generated plurality of sub-patterns based on their respective ratings;
        a pre-match module, which when executed by the one or more processors (i) identifies a first subset of network traffic passing through the network security system as not being potential threats and thereby excluded from full-match processing as a result of the first subset of network traffic not matching any threat detection signatures in the pre-match list and (ii) identifies a second subset of the network traffic as being potential threats and thereby necessitating the full-match processing as a result of the second subset of network traffic matching one or more threat detection signatures in the pre-match list; and a full-match module, which when executed by the one or more processors confirms or refutes the potential threats by performing the full-match processing on the second subset of the network traffic against the pattern database.

2. The system of claim 1, wherein the plurality of patterns comprise any or a combination of fixed string patterns and regular expression patterns.

3. The system of claim 1, wherein the plurality of patterns comprise any or a combination of fixed location type patterns and floating type patterns.

4. The system of claim 1, wherein said rating results in a lower rating for those of the plurality of patterns or, as the case may be, those of the associated generated plurality of sub-patterns having a relatively higher frequency of occurrence within the pattern database than those having a lower frequency of occurrence within the pattern database.

5. The system of claim 1, wherein:
a frequency of occurrence of each pattern of the plurality of patterns within sample traffic or real-time traffic observed by the network security system is determined; and
the rating of each pattern of the plurality of patterns or, as the case may be, each sub-pattern of the associated generated plurality of sub-patterns is adjusted based on the frequency of occurrence within the sample traffic or the real-time traffic.

6. The system of claim 1, wherein said rating results in a higher rating for those of the plurality of patterns or, as the case may be, those of the associated generated plurality of sub-patterns having a relatively longer length.

7. The system of claim 1, wherein the measure of redundancy for each pattern of the plurality of patterns or, as the case may be, each sub-pattern of the associated generated plurality of sub-patterns is based on the length of the pattern or the sub-pattern and character repetitions within the pattern or the sub-pattern.

8. The system of claim 1, wherein the rating of one of the plurality of patterns is manually adjusted.

9. The system of claim 1, further including a blacklist containing a plurality of common patterns within typical network traffic and corresponding adjustable penalties to discourage selection of any of the plurality of common patterns for inclusion within the pre-match list.

10. The system of claim 1, wherein the rating of at least one the plurality of patterns or, as the case may be, the associated generated plurality of sub-patterns is adapted in real-time, at periodic intervals or at user defined intervals.

11. A method comprising:
determining, by a network security device, a frequency of occurrence of each of a plurality of patterns within a pattern database containing set of candidate patterns from which a set of patterns or sub-patterns thereof will be selected for inclusion within a pre-match list of threat detection signatures;
determining, by the network security device, for each pattern of the plurality of patterns, whether a length of the pattern exceeds a pre-defined length, and in such a case, cutting the pattern to generate a plurality of sub-patterns associated with the pattern, each sub-pattern of the plurality of generated sub-patterns having the pre-defined length;
determining, by the network security device, a rating for each pattern of the plurality of patterns or, as the case may be, each sub-pattern of the associated generated plurality of sub-patterns based on any or a combination of the frequency of occurrence of the pattern within the pattern database, the length of the pattern or the sub-pattern and a measure of redundancy within the pattern or sub-pattern;
updating, by the network security device, the pre-match list by selecting for inclusion within the pre-match list a predetermined number of one or more of the patterns of the plurality of patterns and the sub-patterns of the associated generated plurality of sub-patterns based on their respective ratings;
identifying, by the network security device, (i) a first subset of network traffic passing through the network security device as not being potential threats and thereby excluded from full-match processing as a result of the first subset of network traffic not matching any threat detection signatures in the pre-match list and (ii) a second subset of the network traffic as being potential threats and thereby necessitating the full-match processing as a result of the second subset of network traffic matching one or more threat detection signatures in the pre-match list; and
confirming or refuting, by the network security device, the potential threats by performing the full-match processing on the second subset of the network traffic against the pattern database.

12. The method of claim 11, wherein the plurality of patterns comprise any or a combination of fixed string patterns and regular expression patterns.

13. The method of claim 11, wherein the plurality of patterns comprise any or a combination of fixed location type patterns and floating type patterns.

14. The method of claim 11, wherein said determining, by the network device, a rating results in a lower rating for those of the plurality of patterns or, as the case may be, those of the associated generated plurality of sub-patterns having a relatively higher frequency of occurrence within the pattern database than those having a lower frequency of occurrence within the pattern database.

15. The method of claim 11, further comprising:
determining, by the network security device, a frequency of occurrence of each pattern of the plurality of patterns within sample traffic or real-time traffic observed by the network security device; and
adjusting, by the network security device, the rating of each pattern of the plurality of patterns or, as the case may be, each sub-pattern of the associated generated plurality of sub-patterns based on the frequency of occurrence within the sample traffic or the real-time traffic.

16. The method of claim 11, wherein said determining, by the network device, a rating results in a higher rating for those of the plurality of patterns or, as the case may be, those of the associated generated plurality of sub-patterns having a relatively longer length.

17. The method of claim 11, wherein the measure of redundancy for each pattern of the plurality of patterns or, as the case may be, each sub-pattern of the associated generated plurality of sub-patterns is based on the length of the pattern or the sub-pattern and character repetitions within the pattern or the sub-pattern.

18. The method of claim 11, wherein the rating of one of the plurality of patterns is manually adjusted.

19. The method of claim 11, wherein said determining, by the network device, a rating takes into consideration adjustable penalties contained in a blacklist and associated with a plurality of common patterns within typical network traffic in order to discourage selection of any of the plurality of common patterns for inclusion within the pre-match list.

20. The method of claim 11, wherein the rating of at least one the plurality of patterns or, as the case may be, the associated generated plurality of sub-patterns is adapted in real-time, at periodic intervals or at user defined intervals.

* * * * *